W. RINEHOLD.
GATE.
No. 192,456. Patented June 26, 1877.
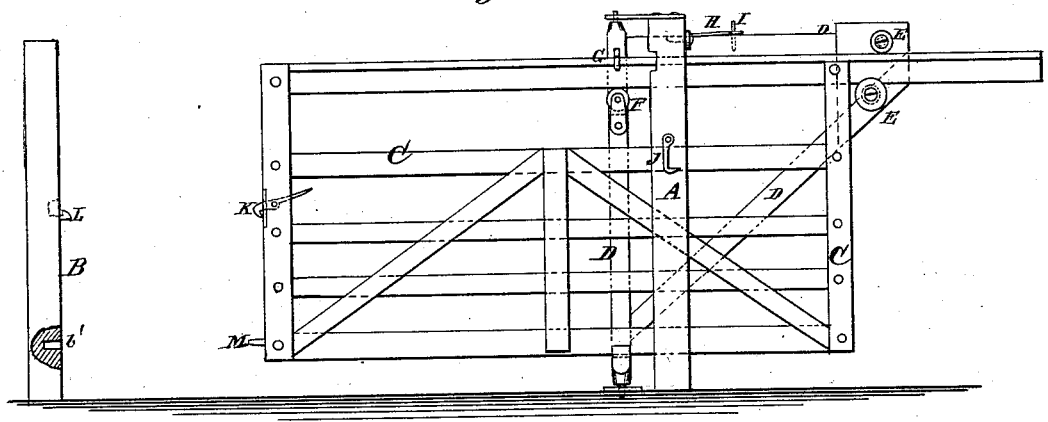
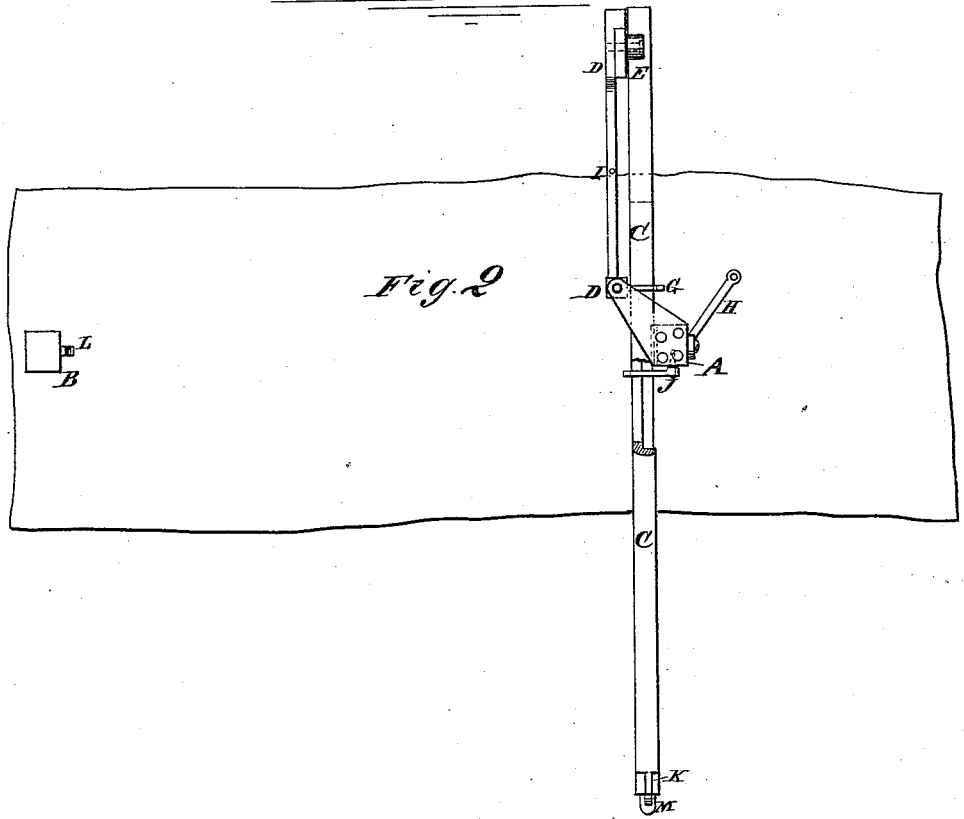
WITNESSES:
A. W. Almqvist
J. H. Scarborough
INVENTOR:
W. Rinehold
BY
Munn &c.
ATTORNEYS.

UNITED STATES PATENT OFFICE.

WILLIAM RINEHOLD, OF ARI, INDIANA, ASSIGNOR TO HIMSELF AND JACOB C. FAIR, OF SAME PLACE.

IMPROVEMENT IN GATES.

Specification forming part of Letters Patent No. 192,456, dated June 26, 1877; application filed April 23, 1877.

*To all whom it may concern:*

Be it known that I, WILLIAM RINEHOLD, of Ari, in the county of Noble and State of Indiana, have invented a new and useful Improvement in Gates, of which the following is a specification:

Figure 1 is a side view of my improved gate partly run back. Fig. 2 is a top view of the same partly run back and swung around.

Similar letters of reference indicate corresponding parts.

The object of this invention is to furnish an improved gate which shall be so constructed that it may be used as a run-back gate or as a swing-gate, as may be desired, or as circumstances may render most convenient.

The invention consists in the combination of the swing, the two pulleys, and the pulley and hook with the gate and the rear post; in the combination of the brace and the pin with the rear post, the swing, and the gate, as hereinafter fully described.

A is the rear post, and B is the front post. C is the gate, which may be formed by attached cross-slats to longitudinal slats, and strengthening it with inclined slats, or of any other desired style. D is the swing, the lower end of the upright bar of which is pivoted to a block set in the ground in front, and at such a distance at one side of the post A that the gate C may slide between the said upright and the said post A. The upper end of the upright of the swing D is pivoted to an arm or bar attached to the top of the post A. The horizontal arm of the swing D is strengthened by an inclined bar attached to its outer end, and to the lower part of the upright bar. To the outer end of the horizontal bar of the swing are pivoted two pulleys or rollers, E, at such a distance apart as to receive the top bar of the gate between them, and one or both of which are flanged to keep the said top bar in place upon them. To the upright bar of the swing D is attached a pulley or roller, F, for the lower edge of the top bar of the gate to rest upon, where it is kept in place by a hook, G, attached to said upright, and which hooks over the top of the said top bar. By this arrangement the gate C will be supported by the pulleys and hook, and can be readily run back and forth to open and shut it. The swing D is kept from turning as the gate is run open and shut by a brace-bar, H, one end of which is attached to the upper end of the post A, and its other end has a hole formed through it to receive a pin, I, attached to the horizontal bar of the said swing D. When it is desired to have the gate swing, the end of the brace H is raised from the pin I, and the gate may then be run back a few inches, half-way, or fully, and then swung around, the gate C and swing D turning together. When the gate has been swung around, a hook, J, pivoted to the side of the post A, may be hooked upon the edge of one of its bars, to prevent it from being blown about by the wind. To the front end of the gate C is pivoted a latch, K, to latch upon a catch, L, attached to the front post B. To prevent the gate from being raised and opened by hogs or other stock, a pin, M, is attached to the forward side of the lower corner of said gate, which, when the gate is closed, enters a hole, b', in the lower part of the post B, so that the gate cannot be raised until it has been unlatched, and run back far enough to withdraw the said pin from the said hole.

Having thus described my invention, I claim as new and desire to secure by Letters Patent—

1. The combination of the swing D, the two pulleys E, and the pulley and hook F G, with the gate C and the post A, substantially as herein shown and described.

2. The combination of the brace H and the pin I with the post A, the swing D, and the gate C, substantially as herein shown and described.

WILLIAM RINEHOLD.

Witnesses:
JACOB C. FAIR,
ED. A. MOSSMAN.